(12) United States Patent
Matsuyama et al.

(10) Patent No.: US 9,433,994 B2
(45) Date of Patent: Sep. 6, 2016

(54) CENTERING DEVICE FOR PLATE-SHAPED WORKPIECE

(71) Applicants: HONDA MOTOR CO., LTD., Minato-ku, Tokyo (JP); OYABE SEIKI CO., LTD., Oyabe-shi, Toyama (JP)

(72) Inventors: Shinya Matsuyama, Tokyo (JP); Yuta Suzuki, Tokyo (JP); Susumu Nishimoto, Tokyo (JP); Toshihiko Matsumoto, Tokyo (JP); Masanao Suzuki, Tokyo (JP); Ryoji Tamai, Oyabe (JP); Hiromitsu Kato, Oyabe (JP)

(73) Assignees: Honda Motor Co., Ltd., Tokyo (JP); Oyabe Seiki Co., Ltd., Toyama (JP)

( * ) Notice: Subject to any disclaimer, the term of this patent is extended or adjusted under 35 U.S.C. 154(b) by 0 days.

(21) Appl. No.: 14/437,952

(22) PCT Filed: Aug. 12, 2013

(86) PCT No.: PCT/JP2013/071780
§ 371 (c)(1),
(2) Date: Apr. 23, 2015

(87) PCT Pub. No.: WO2014/064989
PCT Pub. Date: May 1, 2014

(65) Prior Publication Data
US 2015/0314360 A1 Nov. 5, 2015

(30) Foreign Application Priority Data
Oct. 24, 2012 (JP) ................................. 2012-235062

(51) Int. Cl.
*B65G 47/24* (2006.01)
*B07C 5/02* (2006.01)
(Continued)

(52) U.S. Cl.
CPC ............... *B21D 43/105* (2013.01); *B65H 9/00* (2013.01); *B65H 9/10* (2013.01); *B65H 11/002* (2013.01);
(Continued)

(58) Field of Classification Search
CPC ........ B65G 47/244; B65G 47/24; B07C 5/02
USPC ............. 198/340, 341.08, 401, 502.1, 502.2, 198/502.3; 209/538, 540, 541, 542; 700/229
See application file for complete search history.

(56) References Cited

U.S. PATENT DOCUMENTS 5,238,099 A * 8/1993 Schroeder ............... B65G 13/07
198/456
5,363,968 A * 11/1994 Soloman .................. B07C 5/36
198/725
(Continued)

FOREIGN PATENT DOCUMENTS

| JP | H07-1059 A | 1/1995 |
| JP | 2000-229726 A | 8/2000 |
| JP | 2008-094547 A | 4/2008 |

*Primary Examiner* — Douglas Hess
(74) *Attorney, Agent, or Firm* — Carrier Blackman & Associates, P.C.; William D. Blackman; Jingli Wang

(57) ABSTRACT

A centering device for a plate-shaped workpiece comprises: a table (21) having a conveyor mechanism (23) for conveying a plate-shaped workpiece (10) in the horizontal direction; a camera (56) for taking an image of the plate-shaped workpiece (10) placed on the table (21); a table movement mechanism (28) for moving the table (21) horizontally in the direction orthogonal to the conveyance direction; a table rotation mechanism (60) for rotating the table (21) about a vertical axis; a computation unit (58) for comparing target central position information and information acquired by the camera (56) and computing the movement amount of the conveyor mechanism (23), the movement amount of the table movement mechanism (28), and the movement amount of the table rotation mechanism (60); and a control unit (59) for controlling the conveyor mechanism (23), the table movement mechanism (28), and the table rotation mechanism (60) on the basis of the movement amounts calculated by the computation unit (58).

10 Claims, 11 Drawing Sheets

(51) Int. Cl.
*B21D 43/10* (2006.01)
*B65H 9/00* (2006.01)
*B65H 9/10* (2006.01)
*B65H 11/00* (2006.01)
*G01B 11/00* (2006.01)

(52) U.S. Cl.
CPC ... *B65H 2404/2693* (2013.01); *B65H 2511/20* (2013.01); *B65H 2511/212* (2013.01); *B65H 2511/22* (2013.01); *B65H 2511/232* (2013.01); *B65H 2553/42* (2013.01); *B65H 2557/23* (2013.01); *B65H 2557/24* (2013.01); *G01B 11/002* (2013.01)

(56) References Cited

U.S. PATENT DOCUMENTS

| | | | | |
|---|---|---|---|---|
| 5,370,216 A | * | 12/1994 | Tsuruyama | B25J 9/1697 198/376 |
| 5,407,190 A | * | 4/1995 | Hehn | G03D 13/003 198/456 |
| 5,906,262 A | * | 5/1999 | Miki | B65G 54/02 198/341.02 |
| 5,924,546 A | * | 7/1999 | Funaya | B65G 47/256 198/395 |
| 6,256,091 B1 | * | 7/2001 | Kobayashi | G01N 21/958 356/237.1 |
| 6,360,142 B1 | * | 3/2002 | Miura | B25J 9/1682 118/300 |
| 6,508,351 B1 | * | 1/2003 | Christoffersen | B65B 57/14 198/394 |
| 7,353,954 B1 | * | 4/2008 | Malek | B07C 5/3404 198/400 |
| 8,061,500 B2 | * | 11/2011 | Baccini | H01L 21/681 198/345.1 |
| 8,636,137 B2 | * | 1/2014 | Weber | B65G 47/24 198/456 |
| 8,790,064 B2 | * | 7/2014 | Dorner | B21D 43/003 198/345.1 |
| 8,880,216 B2 | * | 11/2014 | Izumi | B25J 9/1697 198/395 |
| 8,955,666 B2 | * | 2/2015 | Nakajima | B65G 47/1414 198/399 |

* cited by examiner

MOVEMENT AMOUNT OF SECOND MOVEMENT MECHANISM ONLY

CENTERING DEVICE FOR PLATE-SHAPED WORKPIECE

TECHNICAL FIELD

The present invention relates to a centering device for positioning a plate-shaped workpiece in a target centering position for a subsequent step.

BACKGROUND ART

Steps for obtaining a press-molded article using a band plate as a starting material are performed in the following sequence.

A blank is cut from a band plate by a blanking press or another device. The blank is conveyed near to a molding press machine, loaded into the molding press machine by a robot, and press-molded by the molding press machine.

The molding press machine is provided with a molding die. The blank must be placed properly in the molding die. However, the blank may not always be placed in the desired position. As a countermeasure, a centering device is installed to carry out the positioning of the blank.

A variety of centering devices have been proposed (e.g., see Patent Literature 1).

The centering device disclosed in Patent Literature 1 uses implements to grasp blanks. When the blanks have different shapes, numerous implements must be prepared. Manufacturing the implements then incurs high costs, and space for storing the implements is needed. Scratches may also be left in the blanks. When the implements are moved more quickly to increase the conveying speed, the scratches become more prominent.

Implements are replaced with each different blank shape, but the molding press machine is stopped during this replacement. The rate of operation of the molding press machine decreases.

Furthermore, when an attempt is made to simultaneously convey two blanks, controlling the implements is becomes complicated, and as a result it is difficult to convey the two blanks.

It is possible for the blanks to be transported and correctly positioned by a robot without the use of implements, but in this case, a single robot takes too much time and is too slow for the cycle time. When two robots are used in order to make the process fast enough, interference between the robots becomes a problem, control becomes complicated, and more space is needed to install the robots.

Specifically, the centering device of Patent Literature 1 presents problems in that it is difficult to increase the speed, the rate of operation is low, and the device cannot be adapted to conveying a plurality of workpieces.

PRIOR ART LITERATURE

Patent Literature

Patent Literature 1: Japanese Application Laid-Open Publication No. H07-001059

SUMMARY OF INVENTION

Technical Problem

The present invention addresses the problem of providing a centering device in which the speed can be increased, the rate of operation can be increased, and a plurality of workpieces can be conveyed.

Solution to Problem

According to a first aspect of the present invention, there is provided a centering device for a plate-shaped workpiece, which centering device comprises: a table having a conveyor mechanism for conveying a plate-shaped workpiece in the horizontal direction; a camera for capturing an image of the plate-shaped workpiece placed on the table; a table movement mechanism for moving the table horizontally in a direction orthogonal to the conveying direction; a table rotation mechanism for rotating the table about a vertical axis; a computation unit for comparing target centering position information and position information acquired by the camera, and computing the amount of movement of the conveyor mechanism, the amount of movement of the table movement mechanism, and the amount of movement of the table rotation mechanism; and a control unit for controlling the conveyor mechanism, the table movement mechanism, and the table rotation mechanism on the basis of the movement amounts calculated by the computation unit.

Preferably, the table movement mechanism includes a first movement mechanism and a second movement mechanism arranged parallel to each other.

In a preferred form, the computation unit perceives the characteristics of the plate-shaped workpiece from the position information acquired by the camera, and computes the amount of movement of the conveyor mechanism, the amount of movement of the table movement mechanism, and the amount of movement of the table rotation mechanism.

It is preferred that a plurality of the centering devices for a plate-shaped workpiece of the third aspect be provided in series.

The plate-shaped workpiece may be a long piece of sufficient length to span over a plurality of tables.

One plate-shaped workpiece may be placed on each of the tables.

Preferably, the plate-shaped workpiece is an irregularly shaped piece.

According to a second aspect of the present invention, there is provided a centering device for a plate-shaped workpiece, which centering device comprises: a table having a conveyor mechanism for conveying a plate-shaped workpiece in the horizontal direction; a camera for capturing an image of the plate-shaped workpiece placed on the table; a table movement mechanism for moving the table horizontally in the direction orthogonal to the conveying direction; a table rotation mechanism for rotating the table about a vertical axis; a computation unit for comparing target centering position information and position information acquired by the camera, and computing the amount of movement of the conveyor mechanism, the amount of movement of the table movement mechanism, and the amount of movement of the table rotation mechanism; and a control unit for controlling the conveyor mechanism, the table movement mechanism, and the table rotation mechanism on the basis of the movement amounts calculated by the computation unit; wherein the centering device for a plate-shaped workpiece is also provided with a first robot for transferring a plate-shaped workpiece conveyed from a previous step into a subsequent step, and a second robot for transferring the movement-controlled plate-shaped workpiece to a subsequent step; the table movement mechanism includes a first movement mechanism and a second movement mechanism arranged parallel to each other; and the computation unit perceives the characteristics of the plate-shaped workpiece from the position information acquired by the camera, and computing the amount of movement of the conveyor mechanism, the amount of movement of the table movement mechanism, and the amount of movement of the table rotation mechanism.

Advantageous Effects of Invention

In the first aspect of the present invention, the plate-shaped workpiece is conveyed in the horizontal direction by the conveyor mechanism. The workpiece is conveyed together with the table in a direction orthogonal to the conveying direction by the table movement mechanism. Furthermore, the workpiece is turned together with the table around a vertical axis by the table rotation mechanism. The plate-shaped workpiece is positioned by the process described above. The position of the workpiece is adjusted and the workpiece is positioned on the table. With a table, the speed can be increased more easily and the rate of operation can be increased to a greater extent than with implements or robots.

In the invention, the table can be rotated by the first movement mechanism and the second movement mechanism. Specifically, the table movement mechanism is used as a rotation mechanism as well, whereby the table rotation mechanism can be omitted. The funding cost of the centering device can be lowered because an expensive table rotation mechanism is not needed.

In the invention, the computation unit perceives the characteristics (e.g., the edges, holes, etc.) of the plate-shaped workpiece from the position information acquired by the camera. Because there are few elements for which computations are performed, the computations are simple, the load on the computation unit is lessened, and the computation time can be shortened.

In the invention, a plurality of centering devices for a plate-shaped workpiece is provided in series, and it is therefore possible to center a long piece capable of spanning over a plurality of tables. Because a plurality of centering devices for a plate-shaped workpiece is provided in series, one plate-shaped workpiece can be centered on each table. As a result, the centering device can be used for a greater range of purposes.

In the invention, the work of centering a long piece that exceeds the length of each of the tables can be performed.

In the invention, one plate-shaped workpiece is placed on each of the plurality of tables, and a plurality of plate-shaped workpieces can be simultaneously centered.

In the invention, the plate-shaped workpiece is irregularly shaped. The invention is not limited to rectangular plate-shaped workpieces; pieces of non-rectangular, irregular shapes can be centered.

In the second aspect of the invention, the plate-shaped workpiece is conveyed in the horizontal direction by the conveyor mechanism. The workpiece is conveyed together with the table in a direction orthogonal to the conveying direction by the table movement mechanism. Furthermore, the workpiece is turned together with the table around a vertical axis by the table rotation mechanism. The plate-shaped workpiece is positioned by the process described above. The position of the workpiece is adjusted and the workpiece is positioned on the table. With a table, the speed can be increased more easily and the rate of operation can be increased to a greater extent than with implements or robots. Additionally, the computation unit perceives the characteristics (e.g., the edges, holes, etc.) of the plate-shaped workpiece from the position information acquired by the camera. Because there are few elements for which computations are performed, the computations are simple, the load on the computation unit is lessened, and the computation time can be shortened. The present invention provides a centering device in which speed can be increased and the rate of operation can be easily increased.

DESCRIPTION OF EMBODIMENTS

Certain preferred embodiments of the present invention are described in detail below with reference to the accompanying drawings.

EMBODIMENTS

Figure 1:
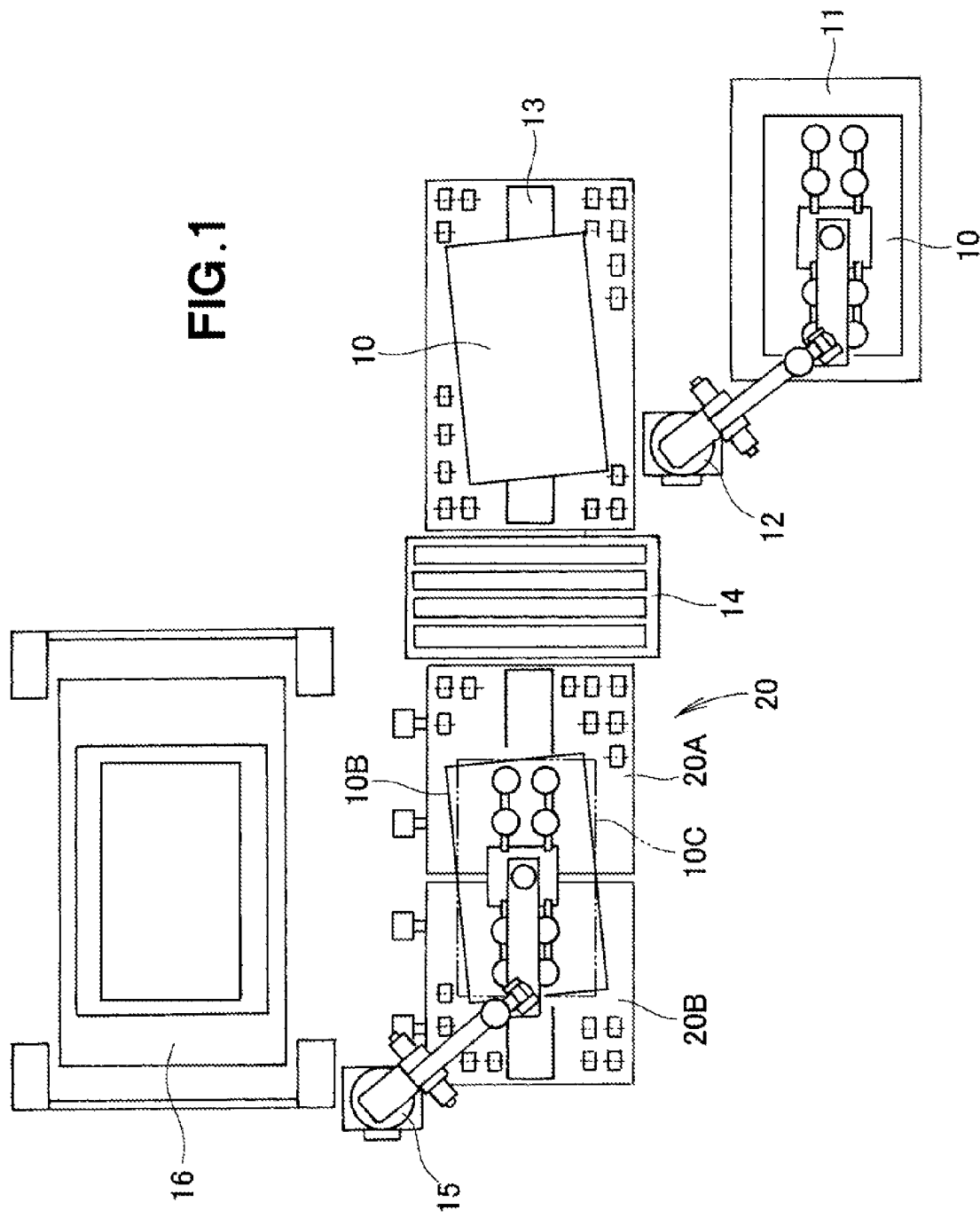
FIG. 1 is a top plan view of a molding press line, including a centering device according to the present invention, with one plate-shaped workpiece placed thereon.

As shown in FIG. 1, one plate-shaped workpiece 10 that has been conveyed in from a previous step is placed on a receiving tray 11. A first robot 12 transfers the plate-shaped workpiece 10 from the receiving tray 11 to an entry table 13. The plate-shaped workpiece 10 is loaded from the entry table 13 onto a washing device 14 and is washed. The washed plate-shaped workpiece 10 is then conveyed to a first centering device 20A and a second centering device 20B.

In this case, the plate-shaped workpiece 10 may be a long piece so as to span over both the first centering device 20A and the second centering device 20B.

The plate-shaped workpieces 10 are hereinafter distinguished by appending the symbol 10B to a plate-shaped workpiece that has been washed but not yet centered, and appending the symbol 10C to a plate-shaped workpiece that has been centered.

The first centering device 20A and the second centering device 20B have the same configuration, and are therefore simply denoted as the centering device 20 when there is no need to make a distinction.

When a non-rectangular plate-shaped workpiece passes through the orthogonal washing roll, the workpiece readily becomes slanted due to the effects of frictional force, high-pressure washing liquid, and the like.

As shown by the solid lines, the plate-shaped workpiece 10B transferred from the washing device 14 to the centering device 20 is slanted.

The role of the centering device 20 is to center the plate-shaped workpiece 10B as shown by the imaginary lines, after the workpiece has been slanted by several causes.

The centered plate-shaped workpiece 10C is loaded onto a molding press device 16 by a second robot 15, and mold-pressing is performed.

It is not impossible for a slanted plate-shaped workpiece 10B to be loaded onto the molding press device 16 while being centered by the second robot 15. However, the act of centering the plate-shaped workpiece using robots must be carried out by the robots in at least two steps (one step for position adjustment, one step for parallel movement). As a result, the operating time of the second robot 15 is longer, and the cycle time of the pressing step is affected. Productivity decreases when the cycle time is longer.

In this respect, the present invention has a shorter operating time for the second robot 15 because the robot merely moves the centered plate-shaped workpiece 10C in parallel. As a result, the cycle time can be reduced and productivity can be increased.

Figure 2:
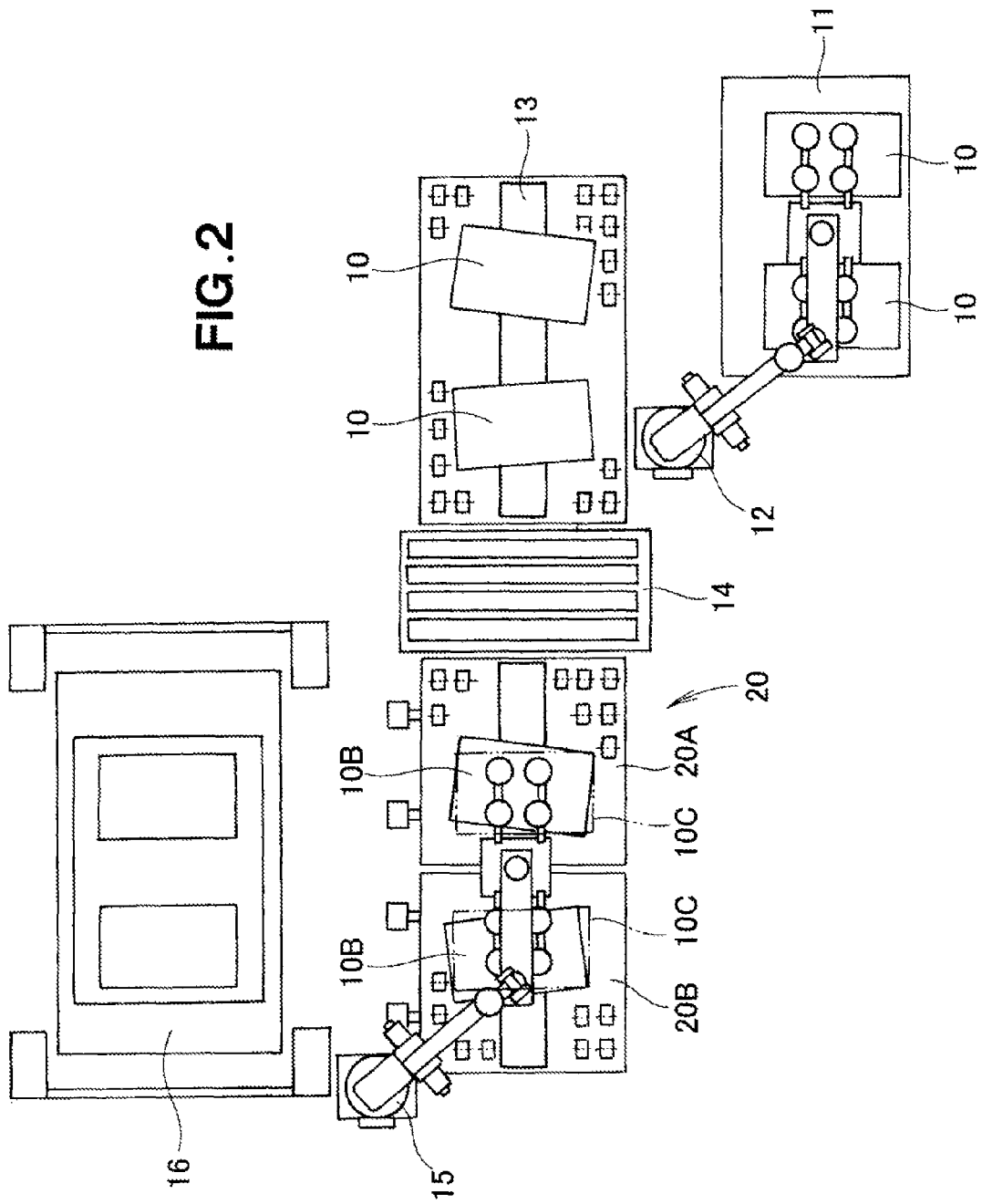
FIG. 2 is a top plan view of a molding press line including the centering device according to the present invention, with two plate-shaped workpieces placed thereon.

Because the centering device 20 of the present invention is composed of the first centering device 20A and the second centering device 20B, it is also possible to center two plate-shaped workpieces 10, 10, as shown in FIG. 2. The same symbols from FIG. 1 are used, and no detailed description is given.

In this case, each plate-shaped workpiece 10 has a length (size) suitable to be accommodated on the first centering device 20A (or the second centering device 20B).

Furthermore, the centering device 20 of the present invention can also center non-rectangular plate-shaped workpieces 10, 10, e.g., trapezoidal workpieces 10, 10. A non-rectangular plate-shaped workpiece 10 may be a single long sheet-shaped object. The same symbols from FIG. 1 are used, and a detailed description is omitted.

Figure 4:
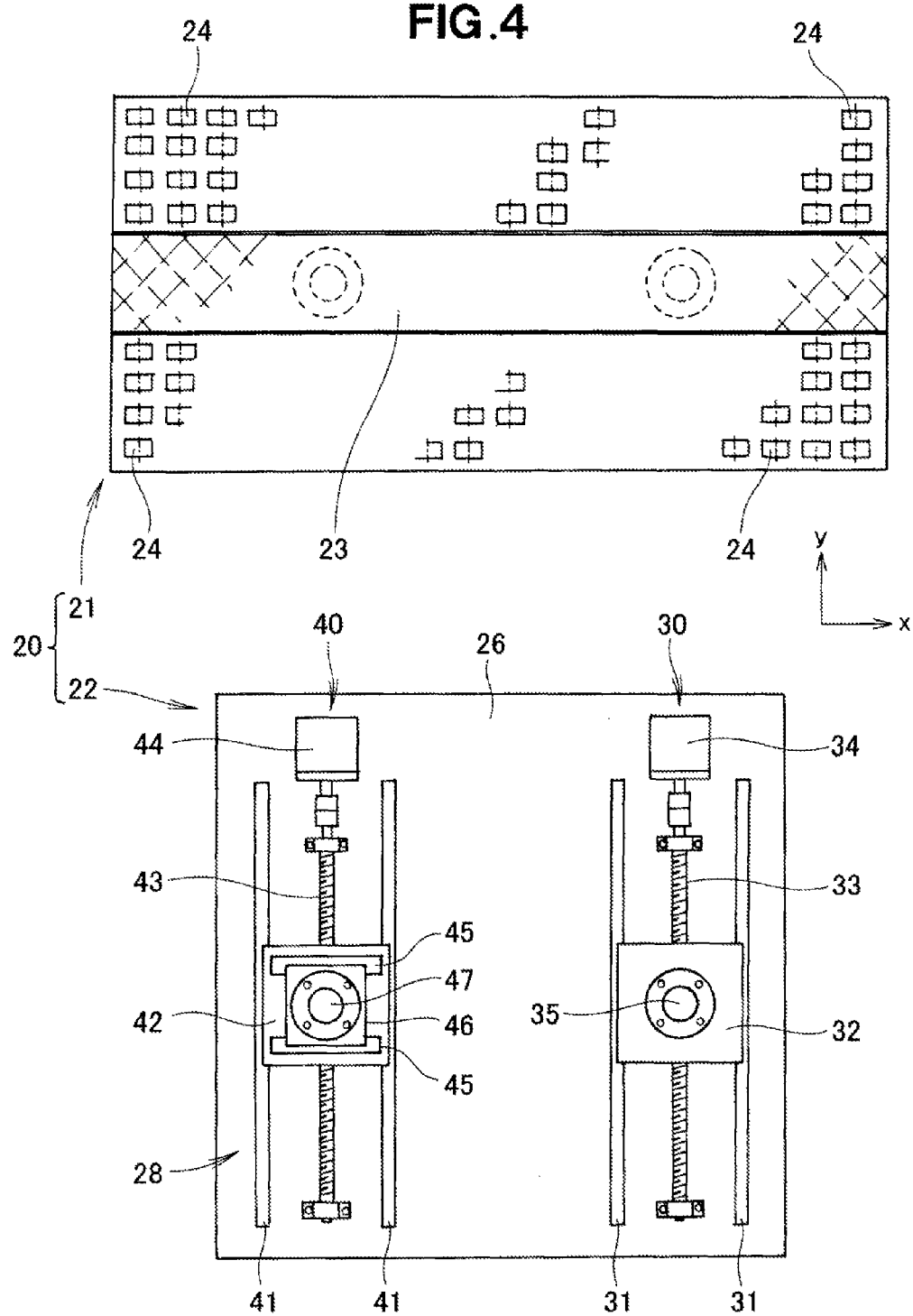
FIG. 4 is an exploded view of the centering device.

As shown in FIG. 4, the centering device 20 is composed of a table 21 and a table support section 22 for supporting the table 21.

The table 21 is composed of a long conveyor mechanism 23 extending along an x-axis, and free rolls 24 arranged on both sides of the conveyor mechanism 23. The main elements of the free rolls 24 are flat rollers. Flat rollers are much less expensive round rollers, and can therefore lower the manufacturing cost of the table 21.

The conveyor mechanism 23 may be any type of conveyor as long as long as it moves back and forth along the x-axis, but is preferably a rubber belt conveyor that does not scuff the bottom surface of the plate-shaped workpiece. Because the type of conveyor does not matter, the entire surface of the table 21 may be made into a belt conveyor.

The main element of the table support section 22 is a table movement mechanism 28 that moves horizontally while supporting the table 21. In this example, the table movement mechanism 28 is composed of a first movement mechanism 30 and a second movement mechanism 40.

The first movement mechanism 30 is composed of two rails 31, 31 arranged along a y-axis on a base 26, a first slider 32 moveably mounted on the rails 31, 31, a first threaded shaft 33 that extends along the y-axis and moves the first slider 32, and a first servo motor 34 that rotates the first threaded shaft 33.

The first threaded shaft 33 is preferably a ball screw. A ball screw has very little friction loss and enables the first servo motor 34 to be reduced in size.

The second movement mechanism 40 is composed of two rails 41, 41 arranged along the y-axis on the base 26, a second slider 42 moveably mounted on the rails 41, 41, a second threaded shaft 43 that extends along the y-axis and moves the second slider 42, a second servo motor 44 that rotates the second threaded shaft 43, sub rails 45, 45 provided on the second slider 42 and extending along the x-axis, and a sub slider 46 moveably mounted on the sub rails 45, 45.

Figure 5:
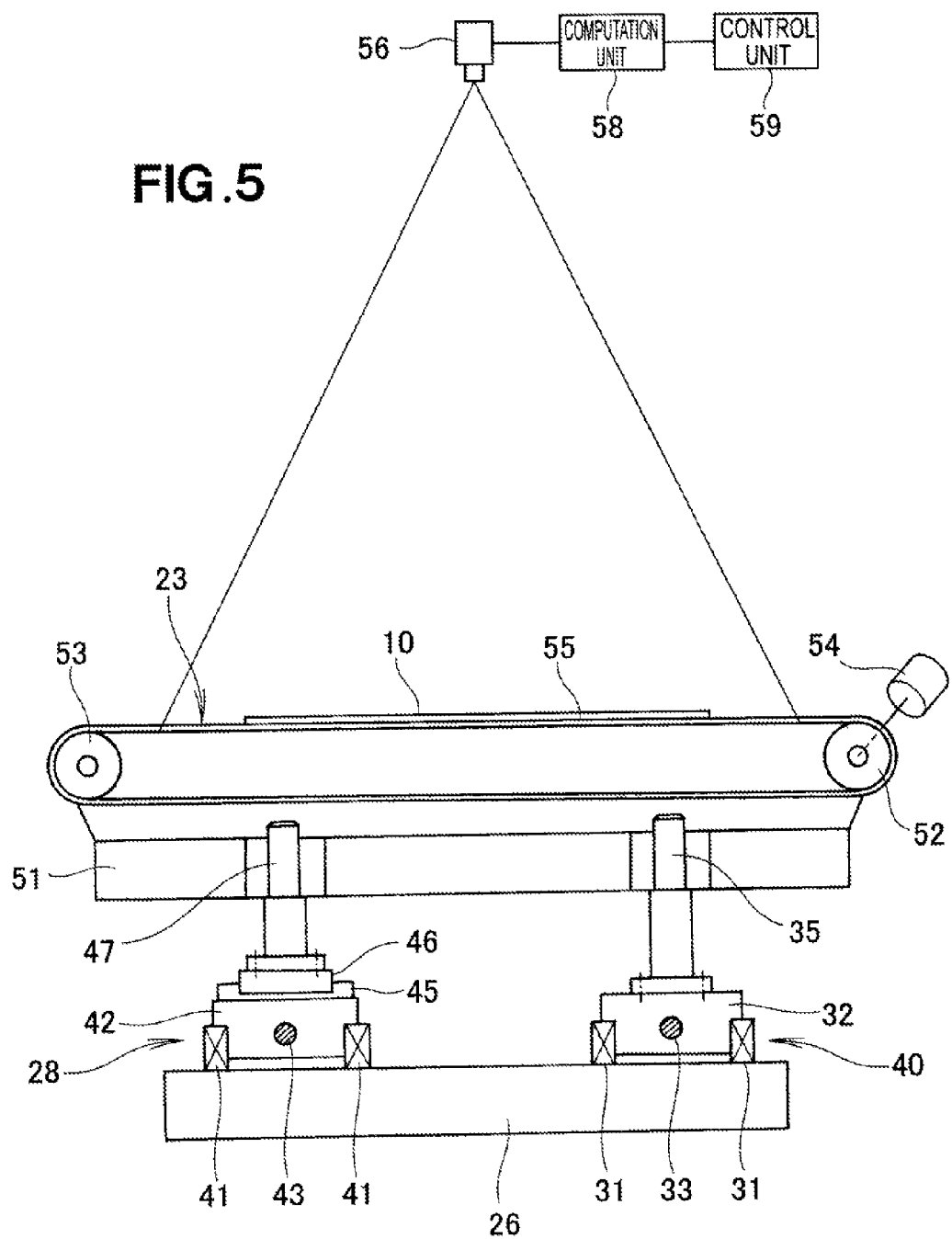
FIG. 5 is a front view of the centering device.

As shown in FIG. 5, the conveyor mechanism 23 is composed of, for example, pulleys 52, 53 rotatably mounted on a table frame 51, a conveyor motor 54 for rotating one pulley 52, and a rubber belt 55 wound on the pulleys 52, 53.

A first support shaft 35 extends upward from the first slider 32 which moves in a direction orthogonal to the image plane, the first support shaft 35 supporting the table frame 51.

A second support shaft 47 extends upward from the sub slider 46 which moves left and right in the drawing, the second support shaft 47 supporting the table frame 51. The first support shaft 35 and the second support shaft 47 are rotatably fitted into the table frame 51.

A camera 56 is arranged above the conveyor mechanism 23. The camera 56 fulfills the role of capturing an image of the entire table (FIG. 4, symbol 21). The camera 56 is preferably a CCD camera, but may be of any type as long as the camera can output image information as electronic information.

A computation unit 58 and a control unit 59 are connected to the camera 56.

As shown in FIG. 6(a), the plate-shaped workpiece 10B shown by the solid lines can be moved a distance Xx along the x-axis to the position of the imaginary lines by the rubber belt 55 being moved by the conveyor motor 54. This distance Xx is equivalent to the amount of movement of the conveyor mechanism 23 needed to move the plate-shaped workpiece 10B. Xx is abbreviated below to the amount of movement of the conveyor mechanism.

As shown in FIG. 6(b), the table 21 can be moved by a distance Yy along the y-axis to the position of the imaginary lines by the first threaded shaft 33 and the second threaded shaft 43 being turned synchronously by the first servo motor 34 and the second servo motor 44. This distance Yy is equivalent to the amount of movement of the table movement mechanism 28 need to move the plate-shaped workpiece 10B. Yy is abbreviated below to the amount of movement of the table movement mechanism.

As shown in FIG. 6(c), the first threaded shaft 33 is stopped and only the second threaded shaft 43 is turned. The table 21 is then rotated (pivoted) by an angle α about the first support shaft 35 to the position of the imaginary lines. Therefore, the table rotation mechanism 60 is configured from the first movement mechanism 30 and the second movement mechanism 40. The angle α is equivalent to the amount of movement of the table rotation mechanism 60 needed to rotate the plate-shaped workpiece 10B. α (the θ described hereinafter) is abbreviated below to the amount of movement of the table rotation mechanism.

Because the table rotation mechanism 60 is included in the table movement mechanism 28 in this invention, there is no need to install special equipment for the table rotation mechanism 60.

Conversely, the action of the table movement mechanism 28 is complicated because the table is pivoted not with the use of a rotation mechanism, but with the use of a linear motion mechanism. The operating principle of the centering device 20 of this structure is described in geometrical terms.

Figure 7:
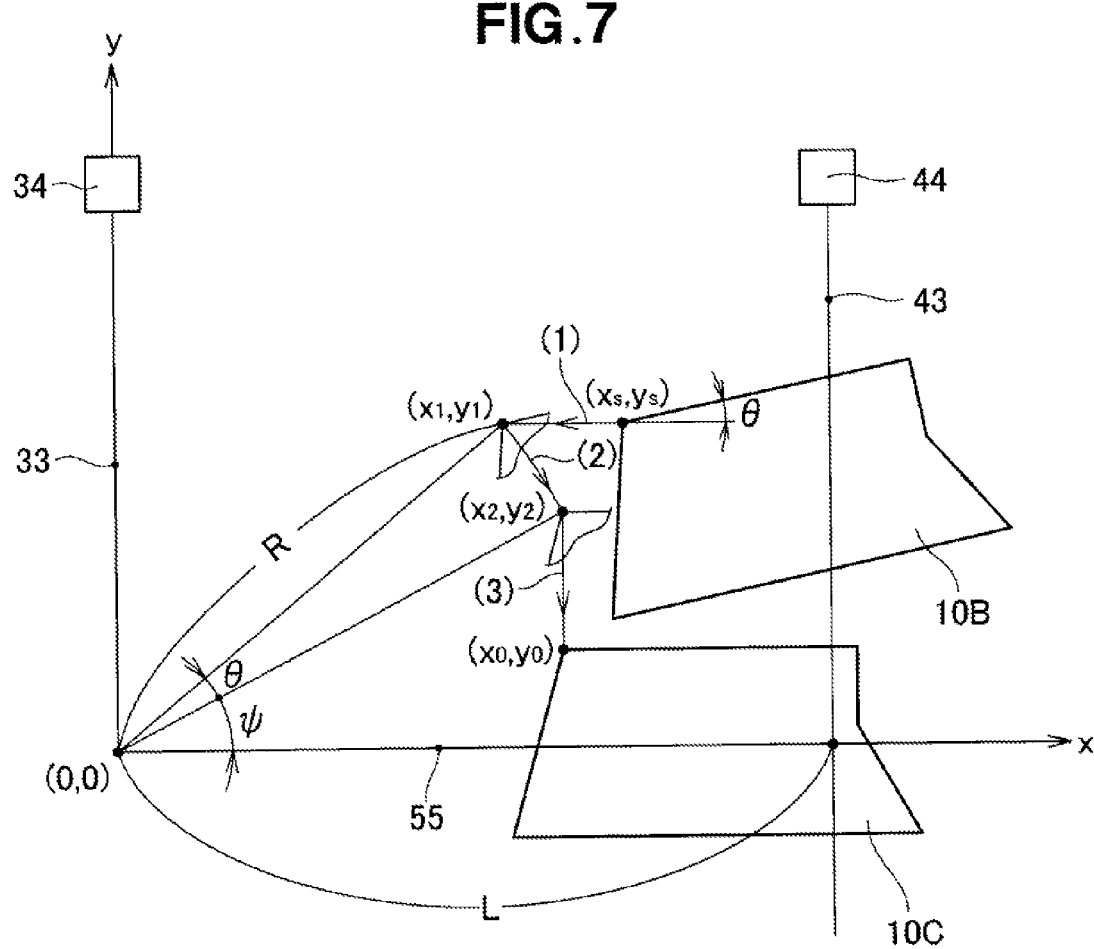
FIG. 7 is a graph illustrating peak coordinates and shift angles of the plate-shaped workpiece.

For the sake of convenience in the description, FIG. 7 shows the first threaded shaft 33 overlaid on the y-axis, and the second threaded shaft 43 to the right thereof. The rubber belt 55 is overlaid on the x-axis.

As shown in FIG. 7, an image is captured of the plate-shaped workpiece 10C centered in the target centering position on the x-axis. The plate-shaped workpiece 10B which has not yet been centered is in the first quadrant, and the camera recognizes the image of the plate-shaped workpiece 10B. The plate-shaped workpiece 10B is a non-rectangular plate, having a substantially trapezoidal shape.

The top left peak coordinates of the plate-shaped workpiece 10C in the target centering position are denoted as (x0, y0). The shape and dimension of each of the plate-shaped workpieces 10C is managed by a computer. This information is inputted in advance from the computer into a separate computation unit (FIG. 5, symbol 58). Specifically, the computation unit has the peak coordinates (x0, y0) in advance.

The top left peak coordinates of the plate-shaped workpiece 10B, of which an image is taken by the camera, are denoted as (xs, ys). These coordinates (xs, ys) are specified by the computation unit (FIG. 5, symbol 58) by analyzing the camera image. Additionally, with the plate-shaped workpiece 10C as a reference, the computation unit detects from the taken image that the plate-shaped workpiece 10B is shifted counterclockwise by an angle θ.

The coordinates (xs, ys) are moved along the x-axis to the coordinates (x1, y1) as indicated by the arrow (1). This movement is carried out as shown in FIG. 6(a).

The coordinates (x1, y1) are turned clockwise by an angle θ about the point of origin (0, 0) as indicated by the arrow (2). The coordinates after this rotation are (x2, y2). This rotation is carried out as shown in FIG. 6(c).

The coordinates (x2, y2) are moved along the y-axis to the coordinates (x0, y0) as indicated by the arrow (3). This movement is carried out as shown in FIG. 6(b).

In FIG. 7, the distance L is the gap between the first threaded shaft 33 and the second threaded shaft 43, and is known. The coordinates (x0, y0), the coordinates (xs, ys), and the angle θ are also known.

In view of this, the following is an examination of how the amount of movement of the conveyor mechanism, the amount of movement of the first movement mechanism, and the amount of movement of the second movement mechanism are established using the known values θ, x0, y0, xs, and ys.

[Eq. 1]

Section of Arrow (1):

$$\text{movement amount of conveyor mechanism} = x_1 - x_s \quad (1)$$

$$y_1 = y_s \quad (2)$$

In the section of the arrow (2) in FIG. 7, turning only the second threaded shaft 43 causes the table to pivot.

Figure 8:
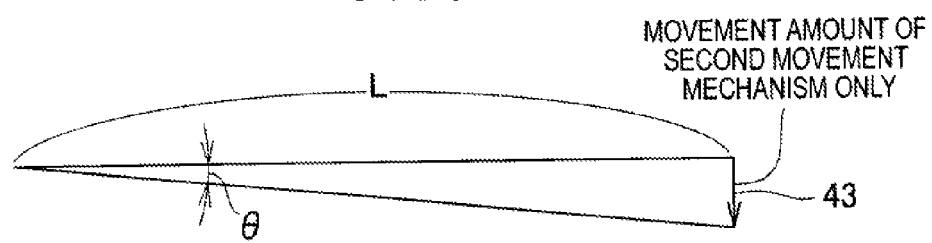
FIG. 8 is a supplemental view for deriving a computation formula.

As shown in FIG. 8, the second threaded shaft 43 is set apart from the point of origin by a distance L. The table can be pivoted clockwise an angle θ by the second movement mechanism, and the amount of movement of the second movement mechanism at this time is determined geometrically.

[Eq. 2]

$$\text{movement amount of second movement mechanism only} = -L \tan \theta \quad (3)$$

Figure 9:
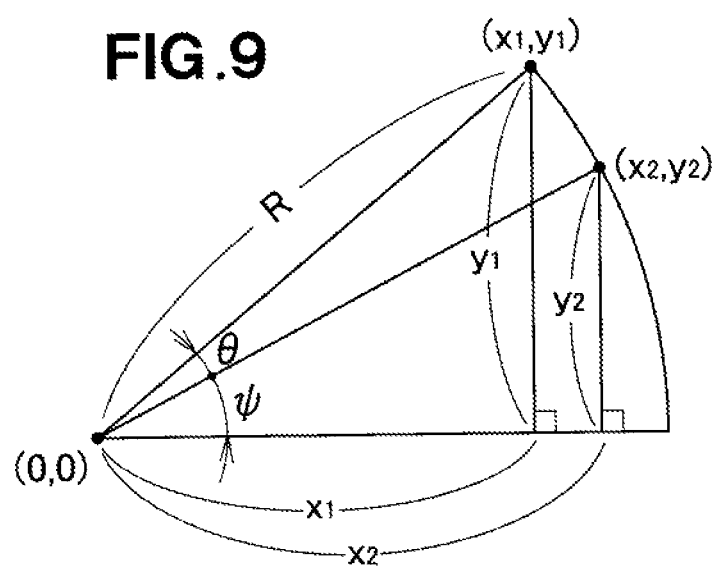
FIG. 9 is a supplemental view for deriving a computation formula.

As shown in FIG. 9, the coordinates (x1, y1) and the coordinates (x2, y2) are points on the radius R, and therefore can be computed as follows.

[Eq. 3]

$$x_2 = R\cos\psi \quad (4)$$
$$y_2 = R\sin\psi$$
$$x_1 = R\cos(\theta + \psi)$$
$$\quad = R\cos\theta\cos\psi - R\sin\theta\sin\psi$$
$$\quad = x_2\cos\theta - y_2\sin\theta$$

$$y_1 = R\sin(\theta + \psi) \quad (5)$$
$$\quad = R\sin\theta\cos\psi + R\cos\theta\sin\psi$$
$$\quad = x_2\sin\theta + y_2\cos\theta$$

In the section of the arrow (3) in FIG. 7, the movement is a simple movement along the y-axis.

[Eq. 4]

$$x_2 = x_0 \quad (6)$$

$$\text{movement amount of first movement mechanism} = y_0 - y_2 \quad (7)$$

$$\text{movement amount of second movement mechanism} = \text{movement amount of first movement mechanism} \quad (8)$$

[Eq. 5]

From (4), $x_1 = x_2 \cos \theta - y_2 \sin \theta$

From (6), $x_2 = x_0$ $$x_1 = x_0 \cos \theta - y_2 \sin \theta \quad (9)$$

From (5), $y_1 = x_2 \sin \theta + y_2 \cos \theta$

From (2), $y_1 = y_s$ and from (6), $x_2 = x_0$; therefore $$y_s = x_0 \sin \theta + y_2 \cos \theta \quad (10)$$

Modifying (10), $y_2 = (y_s - x_0 \sin \theta)/\cos \theta \quad (11)$

Substituting (9) for (11), $x_1 = x_0 \cos \theta - (y_s - x_0 \sin \theta)\tan \theta \quad (12)$

[Eq. 6]

From (1), movement amount of conveyor mechanism = $x_1 - x_s$

Substituting (12), movement amount of conveyor mechanism = $x_0 \cos \theta - (y_s - x_0 \sin \theta)\tan \theta - x_s$

[Eq. 7]

From (7), movement amount of first movement mechanism = $y_0 - y_2$

Substituting (11), movement amount of first movement mechanism=$y_0-(y_s-x_0 \sin \theta)/\cos \theta$

[Eq. 8]

Combining (3) and (8), movement amount of second movement mechanism=$-L \tan \theta$+(movement amount of first movement mechanism)

From the above equations, the computation formulas shown in the following table are determined.

[Eq. 9]

| | Computation Formulas |
|---|---|
| movement amount of conveyor mechanism | $x_0 \cos \theta - (y_s - x_0 \sin \theta) \tan \theta - x_s$ |
| movement amount of first movement mechanism | $y_0 - (y_s - x_0 \sin \theta)/\cos \theta$ |
| movement amount of second movement mechanism | $-L \tan \theta$ + (movement amount of first movement mechanism) |

Figure 6:
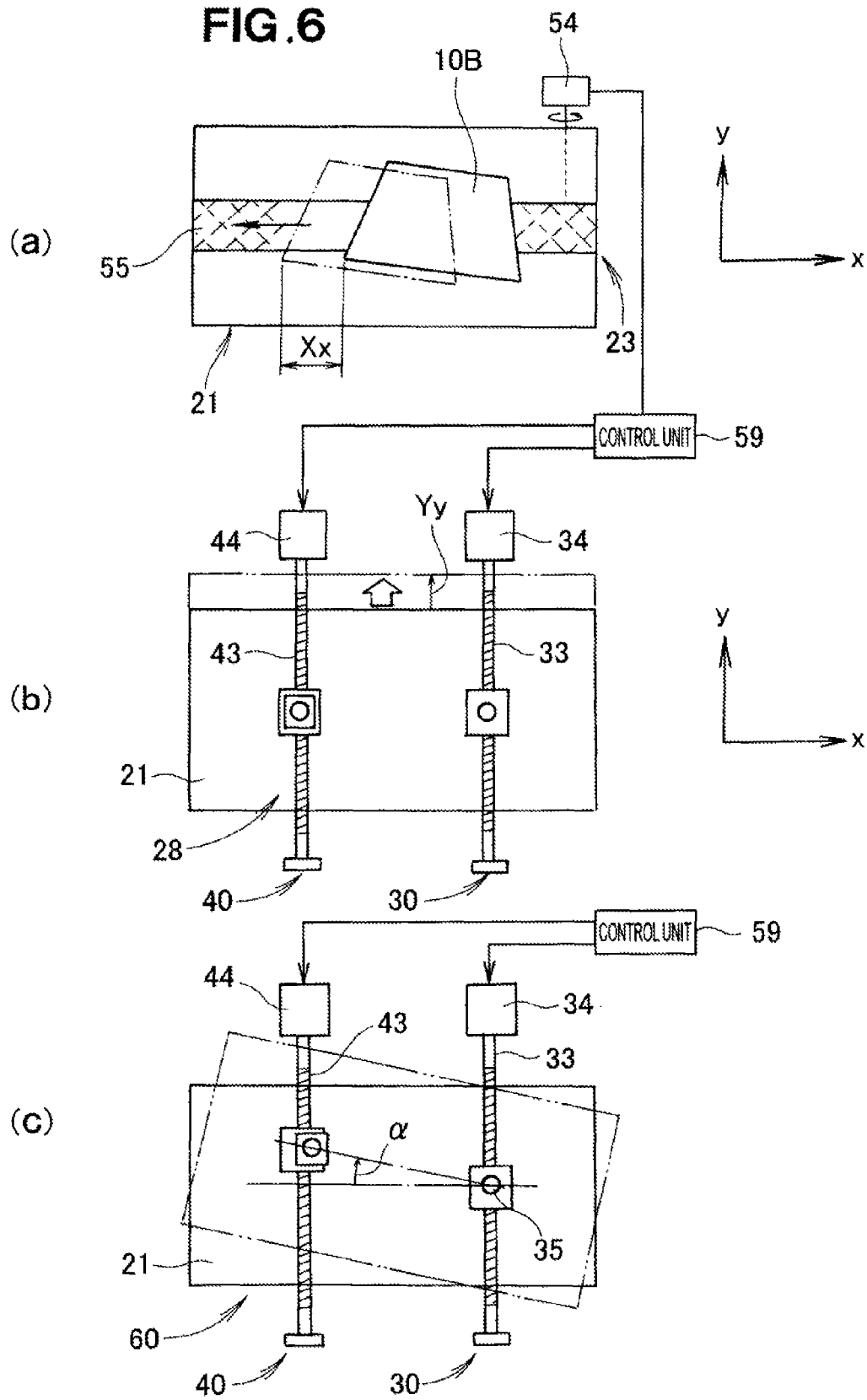
FIG. 6 is a view illustrating an operation of the centering device.

On the basis of the computation formulas given above, the control unit 59 shown in FIG. 6 controls the conveyor motor 54 to move the plate-shaped workpiece 10B in FIG. 6(*a*). The control unit 59 also controls the first servo motor 34 to turn the first threaded shaft 33, and controls the second servo motor 44 to turn the second threaded shaft 43, in FIGS. 6(*b*) and (*c*). As a result, the plate-shaped workpiece 10B shown in FIG. 7 overlaps the plate-shaped workpiece 10C in the target centering position.

The conveyor motor 54 and the first and second servo motors 34, 44 are operated collectively and simultaneously. Specifically, the motors are started simultaneously, and stopped sequentially upon reaching the computed movement amounts.

Carrying out the arrows (1), (2), and (3) shown in FIG. 7 in the stated order can greatly shorten the movement time. Instead of being started simultaneously, the motors may be started in any order.

The computation formulas described above are examined here.

The formulas are computed with the following values: $\theta=5°$, L=700 (mm, the same hereinafter), x0=350, y0=250, xs=500, ys=400.

Movement amount of conveyor, −183.6, movement amount of first movement mechanism, −120.9, movement amount of second movement mechanism, −186.5, satisfactorily consistent with FIG. 7.

In FIG. 1, the plate-shaped workpieces 10B, 10B can be centered because the first centering device 20A and the second centering device 20B both include a camera.

Next, the process for centering a long workpiece will be described.

Figure 10:
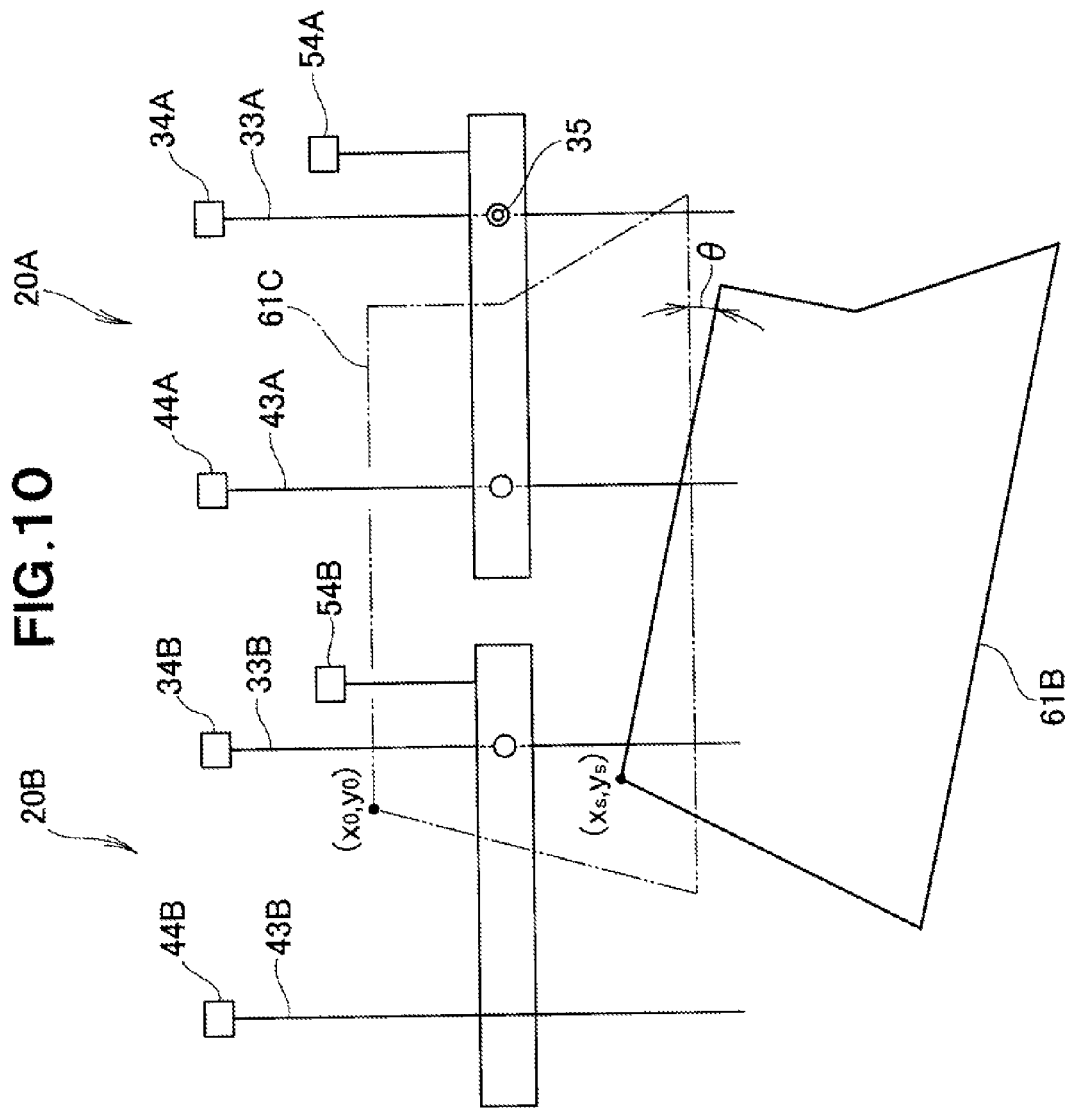
FIG. 10 is a view illustrating centering performed on a long workpiece.

As shown in FIG. 10, a long workpiece 61B is placed so as to span over both the first centering device 20A and the second centering device 20B. A long workpiece 61C set in the target centering position is shown by imaginary lines.

The coordinates (xs, ys) and the shift angle $\theta$ can be detected from the image taken by the camera of the second centering device 20B. The coordinates (x0, y0) are inputted in advance.

On the basis of the computations by the computation unit, the control unit synchronously operates a right conveyor motor 54A and a left conveyor motor 54B With a first threaded shaft 33A of the first centering device 20A kept still, a second threaded shaft 43A of the first centering device 20A and first and second threaded shafts 33B, 43B of the second centering device 20B are turned about the first support shaft 35 of the first centering device 20A, the first support shaft 35 being an overall pivotal center. Both tables are pivoted by an angle $\theta$ about the first threaded shaft 33A of the first centering device 20A, the first threaded shaft 33A being an overall pivotal center.

For the movement along the y-axis, four servo motors 34A, 44A, 34B, and 44B are preferably turned simultaneously.

Specifically, the control unit operates a first servo motor 34A and a second servo motor 44A of the first centering device 20A, and a first servo motor 34B and a second servo motor 44B of the second centering device 20B. As a result, the plate-shaped workpiece 61B is centered and overlaid on the plate-shaped workpiece 61C.

In this example, two centering devices 20A, 20B are arranged in series, but three or more may also be arranged. Doing so makes it possible to center workpieces ranging from extremely short plate-shaped pieces to heavy and long pieces with one set of equipment.

Modifications of the centering device according to the present invention are described next.

Figure 11:
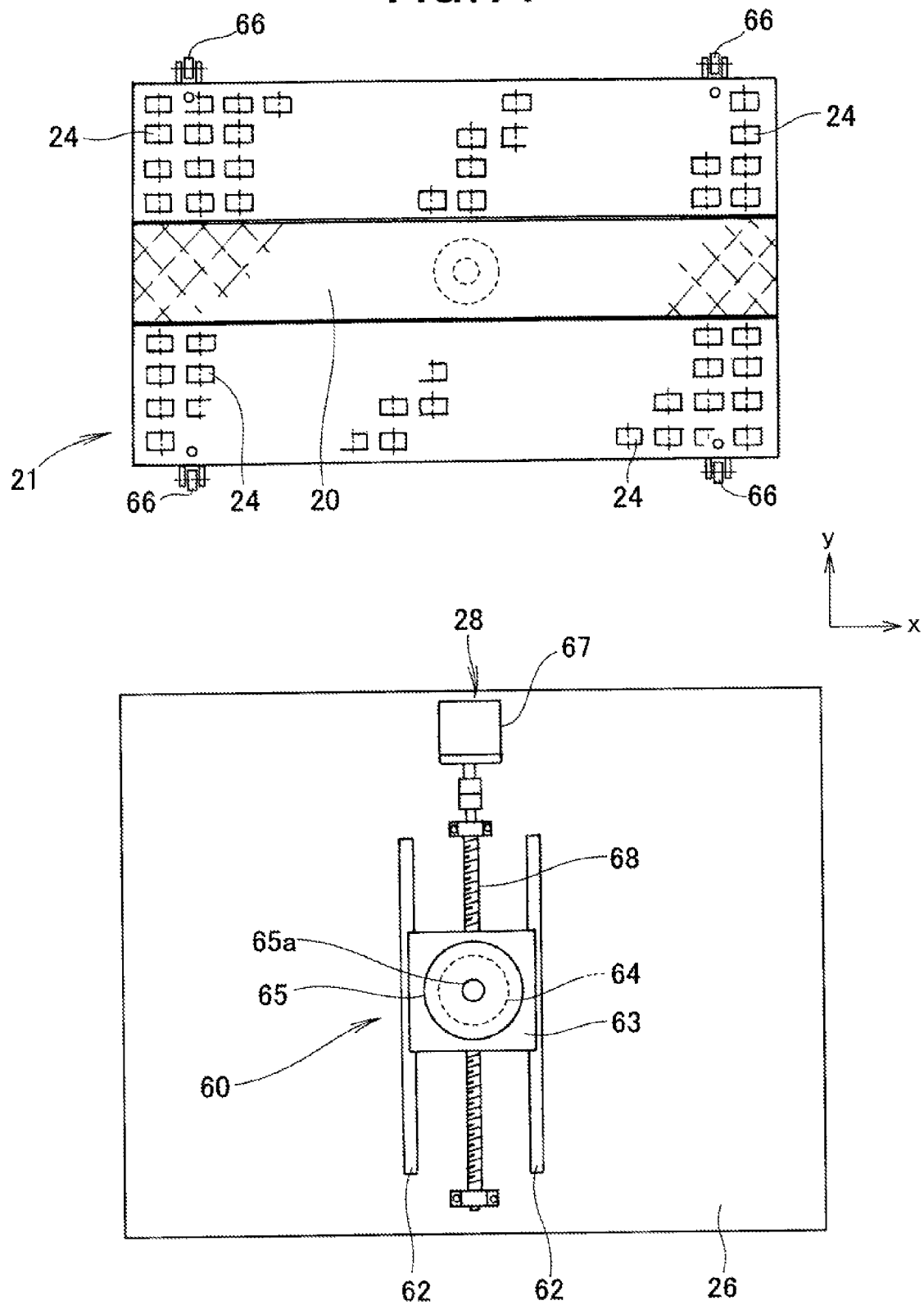
FIG. 11 is a view illustrating a separate embodiment of a centering device.

As shown in FIG. 11, rails 62, 62 are laid on the base 26, a slider 63 is provided on the rails 62, 62 so as to be capable of moving along the y-axis, and the slider 63 is moved in the y-axis direction by a threaded shaft 68 turned by a movement servo motor 67. Specifically, the table movement mechanism 28 is configured from the threaded shaft 68 and the movement servo motor 67 in this example. Therefore, the configuration of the table movement mechanism 28 can be modified as appropriate.

A rotation servo motor 64 is placed on the slider 63, a reduction gear mechanism 65 is placed on the rotation servo motor 64, and the table 21 is supported by a reduction gear mechanism shaft 65*a* of the reduction gear mechanism 65. Four adjustable wheels 66 are provided to the table 21. The adjustable wheels 66 travel over the base 26, suppressing upward and downward movement of the table 21. The bending load on the reduction gear mechanism shaft 65*a* can be greatly reduced by the adjustable wheels 66.

Figure 12:
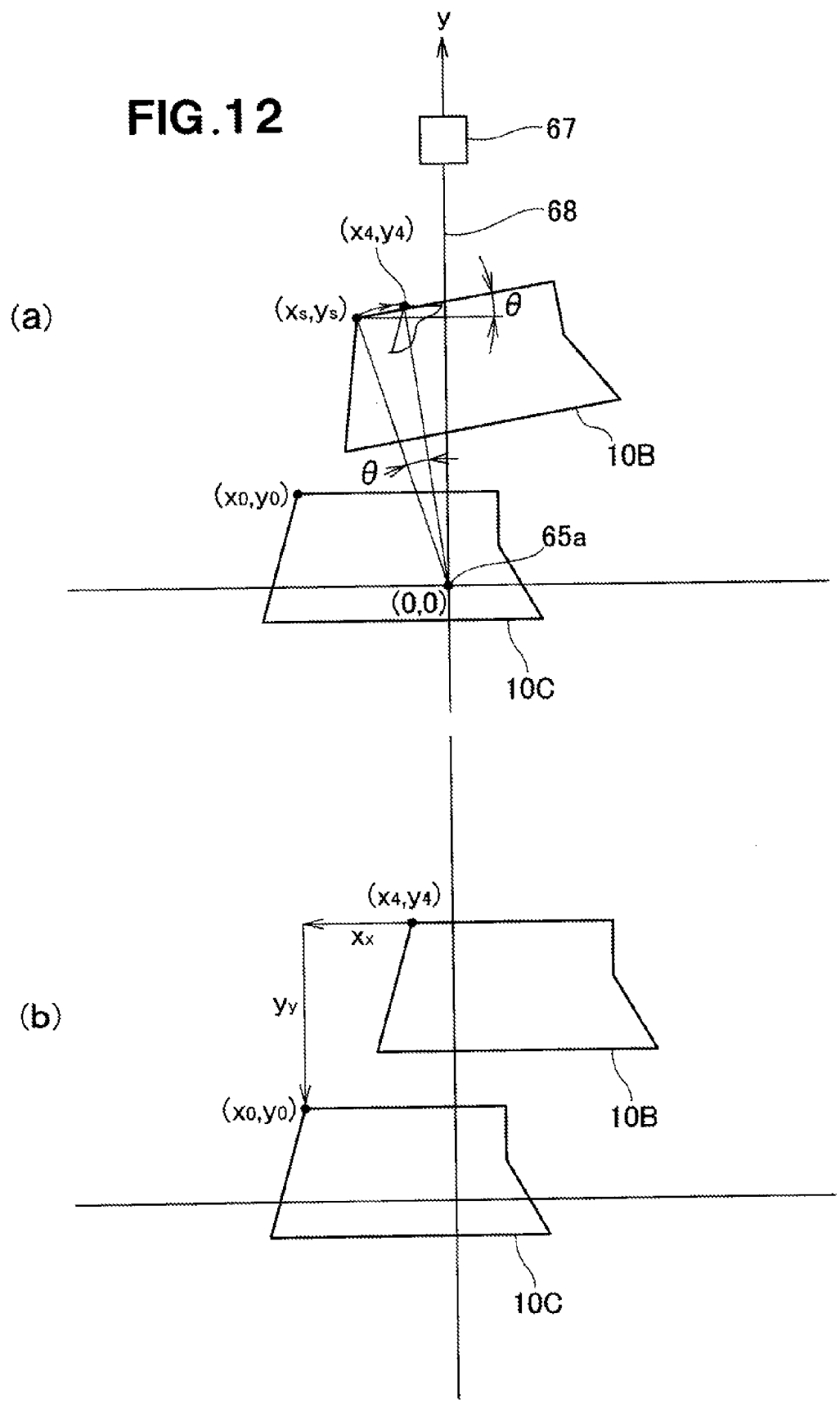
FIG. 12 illustrates an operation of the centering device according to the separate embodiment.

As shown in FIG. 12(*a*), the reduction gear mechanism shaft 65*a* is located at the point of origin (0, 0). The coordinates (x0, y0), the coordinates (xs, ys), and the angle $\theta$ are known.

The plate-shaped workpiece 10B is turned clockwise by the angle $\theta$ about the point of origin (0, 0). The peak coordinates (x4, y4) after the turning are geometrically determined, similar to the range (2) in FIG. 7.

As shown in FIG. 12(*b*), the orientation of the plate-shaped workpiece 10B is consistent with that of the plate-shaped workpiece 10C. The plate-shaped workpiece 10B is moved a distance Xx along the x-axis, and is also moved a distance Yy along the y-axis. Xx is unambiguously determined to be (x0-x4), and Yy to be (y0-y4). As a result, the plate-shaped workpiece 10B is overlaid on the plate-shaped workpiece 10C.

In FIG. 11, it is preferable that the Xx movement be performed by the conveyor mechanism 23, the shift angle $\theta$ be corrected by the rotation servo motor 64, and the Yy movement be performed by the reduction gear mechanism 65 and the threaded shaft 68.

Specifically, in this example, the reduction gear mechanism 65 and the threaded shaft 68 are equivalent to the table movement mechanism 28, and the rotation servo motor 64 and the reduction gear mechanism 65 are equivalent to the table rotation mechanism 60.

A mechanism that yields a high reduction ratio, such as a planetary gear mechanism, is employed for the reduction gear mechanism 65. Because such a precise rotational angle is required, a reduction gear mechanism having a high reduction ratio is needed.

The threaded shaft 43 shown in FIG. 4 also serves alone as a high-reduction-ratio reduction gear mechanism. Consequently, costs can easily be reduced with the configuration of FIG. 4.

As illustrated in FIG. 1, the centering device of the present invention is preferably installed in the entrance of a molding press machine, but may also be used in other applications.

As shown in FIG. 1, when a plate-shaped workpiece is of sufficient length to span over two tables, the centering device 20 of the present invention can carry out the centering of the long piece by simultaneously rotating and moving the long piece. In the present invention, rotation and movement are performed simultaneously and in parallel, and therefore the working time for centering a long piece can be reduced and productivity can be increased to a greater extent than in a case in which rotation and movement are performed in series (sequentially).

As shown in FIG. 2, when a plate-shaped workpiece is placed on each of two tables, the centering device 20 of the present invention centers the plate-shaped workpieces independently of each other by simultaneously rotating and moving the two plate-shaped workpieces. Because rotation and movement are performed simultaneously and in parallel, the working time for centering two plate-shaped workpieces can be reduced and productivity can be increased. Productivity can be further improved because two plate-shaped workpieces are centered simultaneously.

Figure 3:
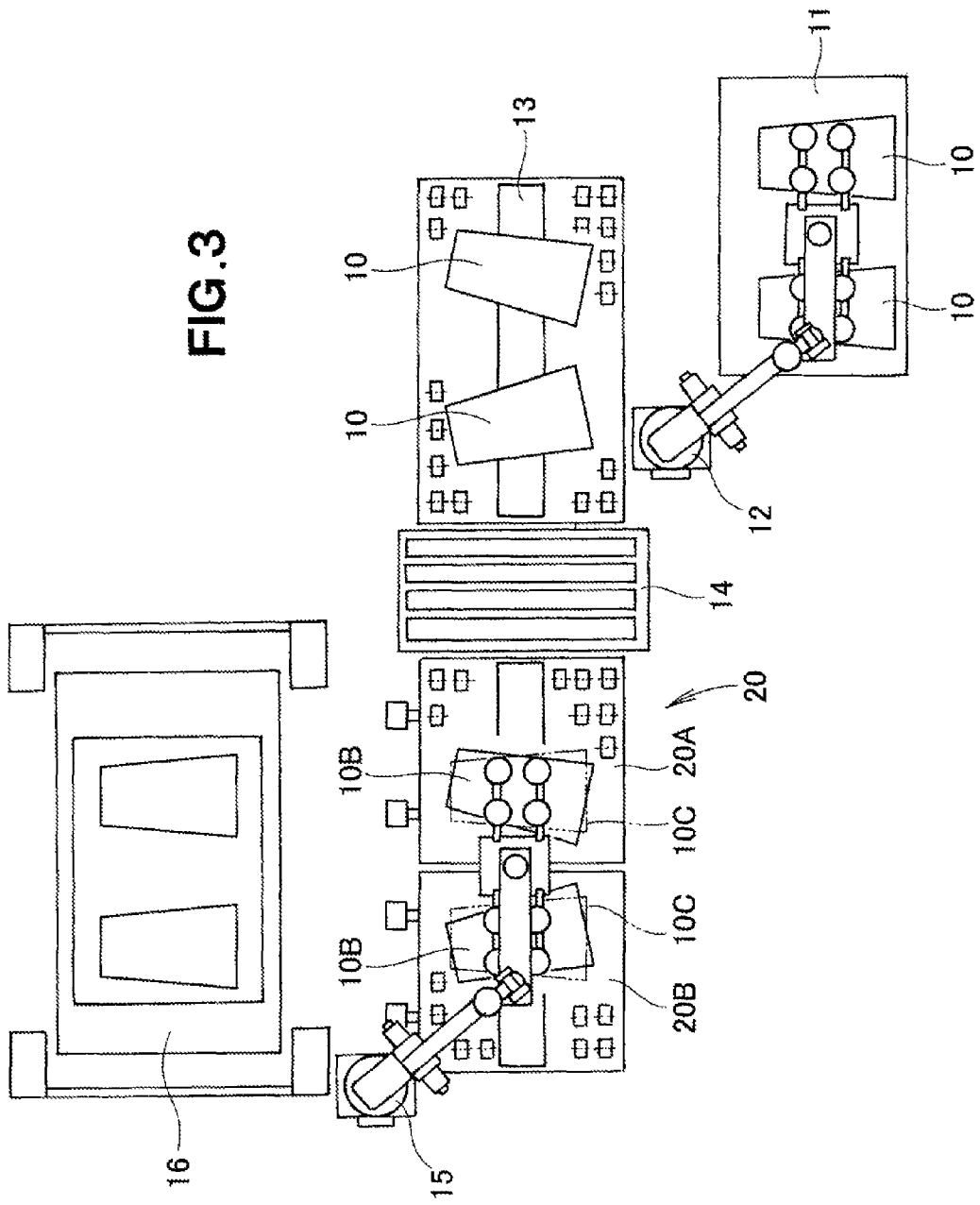
FIG. 3 is a top plan view of a molding press line including the centering device according to the present invention, with two plate-shaped workpieces of irregular shapes placed thereon.

As shown in FIG. 3, workpieces of irregular shapes, such as trapezoids, can be centered. Irregularly shaped workpieces can be centered quickly and easily, no different from rectangular pieces.

Two tables were aligned in series in the embodiments, but three or more tables may be aligned in series as well.

INDUSTRIAL APPLICABILITY

In the present invention, it is preferable that the centering device of the present invention be installed in the entrance of a molding press machine.

LIST OF REFERENCE SIGNS

10: plate-shaped workpiece, 10B: plate-shaped workpiece before being centered, 10C: plate-shaped workpiece centered in target centering position, 12: first robot, 15: second robot, 20: centering device, 21: table, 23: conveyor mechanism, 28: table movement mechanism, 30: first movement mechanism, 40: second movement mechanism, 56: camera, 58: computation unit, 59: control unit, 60: table rotation mechanism.

The invention claimed is:

1. A centering device for a plate-shaped workpiece, comprising:
a table having a conveyor mechanism for conveying a plate-shaped workpiece in a horizontal direction;
a camera for capturing an image of the plate-shaped workpiece placed on the table;
a table movement mechanism for moving the table horizontally in a direction orthogonal to the conveying direction and rotating the table about a vertical axis;
a computation unit for, based on shape information of a workpiece and target centering position information, comparing the target centering position information and position information acquired by the camera, and computing an amount of movement of the conveyor mechanism and an amount of movement of the table movement mechanism in order to correct a shift between the target centering position information and the position information acquired by the camera; and
a control unit for controlling the conveyor mechanism and the table movement mechanism based on the movement amounts calculated by the computation unit,
wherein the table movement mechanism comprises:
a base that is horizontally disposed;
a first slider that is supported moveably in the direction orthogonal to the conveying direction by the base;
a first threaded shaft that moves the first slider in the direction orthogonal to the conveying direction;
a first servo motor that rotates the first threaded shaft;
a first support shaft that extends upward from the first slider and supports one end of the table from below;
a second slider that is supported moveably in the direction orthogonal to the conveying direction by the base;
a second threaded shaft that moves the second slider in the direction orthogonal to the conveying direction;
a second servo motor that rotates the second threaded shaft;
a sub slider that is supported moveably in the conveying direction by the second slider; and
a second support shaft that extends upward from the sub slider and supports the other end of the table from below.

2. The centering device of claim 1, wherein the computation unit perceives the characteristics of the plate-shaped workpiece from the position information acquired by the camera, and computes the amount of movement of the conveyor mechanism and the amount of movement of the table movement mechanism.

3. A centering device for a plate-shaped workpiece, comprising a plurality of the centering devices of claim 2 provided in series.

4. The centering device of claim 3, wherein each of the tables of respective ones of the centering devices is configured to support a portion of the plate-shaped workpiece which is sufficiently long to span over more than one said table.

5. The centering device of claim 4, wherein each of each of the tables of respective ones of the centering devices is configured to support a portion of the plate-shaped workpiece which is an irregularly shaped piece.

6. The centering device of claim 3, wherein each of the tables of respective ones of the centering devices is configured to support a portion of one plate-shaped workpiece which is placed thereon.

7. A centering device for a plate-shaped workpiece, comprising:
a table having a conveyor mechanism for conveying a plate-shaped workpiece in a horizontal conveying direction;
a camera for capturing an image of the plate-shaped workpiece placed on the table;

a table movement mechanism for moving the table horizontally in a direction orthogonal to the conveying direction and rotating the table about a vertical axis;
a computation unit for comparing, based on shape information of a workpiece and target centering position information, target centering position information and position information in the image captured by the camera, and computing an amount of movement of the conveyor mechanism and an amount of movement of the table movement mechanism in order to correct a shift between the target centering position information and the position information in the image captured by the camera; and
a control unit for controlling the conveyor mechanism and the table movement mechanism based on the movement amounts calculated by the computation unit;
the centering device for a plate-shaped workpiece also being provided with a first robot for transferring a plate-shaped workpiece conveyed from a previous step into a subsequent step, and a second robot for transferring the movement-controlled plate-shaped workpiece to a subsequent step;
wherein the table movement mechanism comprising:
  a base that is horizontally disposed;
  a first slider that is supported moveably in the direction orthogonal to the conveying direction by the base;
  a first threaded shaft that moves the first slider in the direction orthogonal to the conveying direction;
  a first servo motor that rotates the first threaded shaft;
  a first support shaft that extends upward from the first slider and supports one end of the table from below;
  a second slider that is supported moveably in the direction orthogonal to the conveying direction by the base;
  a second threaded shaft that moves the second slider in the direction orthogonal to the conveying direction;
  a second servo motor that rotates the second threaded shaft;
  a sub slider that is supported moveably in the conveying direction by the second slider; and
  a second support shaft that extends upward from the sub slider and supports the other end of the table from below; and
the computation unit perceiving the characteristics of the plate-shaped workpiece from the position information in the image captured by the camera, and computing the amount of movement of the conveyor mechanism and the amount of movement of the table movement mechanism.

8. A method for centering a plate-shaped workpiece, comprising the steps of:

providing a table having a conveyor mechanism for conveying a plate-shaped workpiece in a horizontal direction;
capturing an image of the plate-shaped workpiece placed on the table using a camera;
providing a table movement mechanism for moving the table horizontally in a direction orthogonal to the conveying direction and rotating the table about a vertical axis;
comparing target centering position information and position information of the plate-shaped workpiece in the image captured by the camera;
computing an amount of movement of the conveyor mechanism and an amount of movement of the table movement mechanism needed in order to correct any shift between the target centering position information and the position information in the image captured by the camera, based on shape information of a workpiece and target centering position information; and
controlling the conveyor mechanism and the table movement mechanism based on the movement amounts calculated by a control unit.

9. The method for centering a plate-shaped workpiece of claim 8, wherein the table movement mechanism comprises:
a base that is horizontally disposed;
a first slider that is supported moveably in the direction orthogonal to the conveying direction by the base;
a first threaded shaft that moves the first slider in the direction orthogonal to the conveying direction;
a first servo motor that rotates the first threaded shaft;
a first support shaft that extends upward from the first slider and supports one end of the table from below;
a second slider that is supported moveably in the direction orthogonal to the conveying direction by the base;
a second threaded shaft that moves the second slider in the direction orthogonal to the conveying direction;
a second servo motor that rotates the second threaded shaft;
a sub slider that is supported moveably in the conveying direction by the second slider; and
a second support shaft that extends upward from the sub slider and supports the other end of the table from below.

10. The method for centering a plate-shaped workpiece of claim 8, wherein in the computing step characteristics of the plate-shaped workpiece are determined from the position information in the image captured by the camera, and the amount of movement of the conveyor mechanism and the amount of movement of the table movement mechanism are computed based on the determined characteristics of the plate-shaped workpiece.

* * * * *